(12) United States Patent
Hahn et al.

(10) Patent No.: US 7,318,464 B2
(45) Date of Patent: Jan. 15, 2008

(54) PNEUMATIC RUBBER TIRE HAVING ANNULAR RUBBER STRIP CONTAINING ELECTRICALLY CONDUCTIVE BONDED TO ITS INNER SURFACE

(75) Inventors: Bruce Raymond Hahn, Hudson, OH (US); Tarah Pecora Shpargel, Solon, OH (US); Joseph Carmine Lettieri, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 420 days.

(21) Appl. No.: 10/346,652

(22) Filed: Jan. 17, 2003

(65) Prior Publication Data

US 2004/0140030 A1    Jul. 22, 2004

(51) Int. Cl.
*B60C 23/00*        (2006.01)
*B60C 19/00*        (2006.01)

(52) U.S. Cl. .................... 152/152.1; 152/565
(58) Field of Classification Search ............... 152/152, 152/565
See application file for complete search history.

(56) References Cited

U.S. PATENT DOCUMENTS

| | | | |
|---|---|---|---|
| 3,035,016 A | 5/1962 | Bruner | 260/46.5 |
| 3,189,576 A | 6/1965 | Sweet | 260/46.5 |
| 3,382,205 A | 5/1968 | Beers | 260/37 |

(Continued)

FOREIGN PATENT DOCUMENTS

EP           689950          1/1996

(Continued)

OTHER PUBLICATIONS

Technical Data Sheet, Product 5900, Loctite Corporation, 1001 Trout Brook Crossing, Rocky Hill, Connecticut 06067-3910. Aug. 2002.

(Continued)

*Primary Examiner*—Justin R. Fischer
(74) *Attorney, Agent, or Firm*—Henry C. Young, Jr.

(57) ABSTRACT

A pre-cured pneumatic rubber tire of open toroidal shape having a pre-cured rubber strip, comprised of at least one elastomer and which contains at least one electrically conductive element, adhesively bonded to an inner surface of the tire's cavity. The adhesive is an RTV polysiloxane comprised of an hydroxyl terminated (silanol terminated) polysiloxane and crosslinking agent. The adhesive is applied as a layer, or coating, thereof onto a surface of said pre-cured rubber strip, and/or onto a corresponding pre-cured inner surface of said pre-cured tire, and the resulting coated pre-cured rubber strip and inner surface of said pre-cured tire brought together with said layer of adhesive therebetween and the adhesive allowed to cure and thereby bond said strip to said tire inner surface. In one aspect of the invention, said strip is an annular pre-cured rubber strip bonded to the tire's inner surface in its crown region or to said tire inner surface circumferential with and close to the periphery of the tire's open cavity. In another aspect of the invention, said tire inner surface is of a textured configuration and optionally contains a thin coating thereon of a polysiloxane material. In a further aspect of the invention, said pre-cured rubber strip contains a transducer and/or microprocessor inductively and/or electrically connected to said electrically conductive element(s), for example a wire antenna, contained in said rubber strip.

1 Claim, 4 Drawing Sheets

U.S. PATENT DOCUMENTS

| | | | |
|---|---|---|---|
| 3,962,160 A | 6/1976 | Beers | 260/18 |
| 4,317,692 A * | 3/1982 | Niconchuk | 156/97 |
| 4,323,489 A | 4/1982 | Beers | 524/788 |
| 4,356,116 A | 10/1982 | Beers | 524/837 |
| 4,380,660 A | 4/1983 | Mathew | 556/422 |
| 4,400,527 A | 8/1983 | Mathew | 556/422 |
| 4,720,530 A | 1/1988 | Wurminghausen et al. | 528/18 |
| 4,735,979 A | 4/1988 | Beers et al. | 524/188 |
| 4,847,396 A | 7/1989 | Beers et al. | 556/421 |
| 4,918,209 A | 4/1990 | Baule et al. | 556/422 |
| 5,789,480 A * | 8/1998 | Adachi et al. | 524/863 |
| 5,971,046 A * | 10/1999 | Koch et al. | 152/152.1 |
| 6,013,754 A | 1/2000 | Fillion et al. | 528/34 |
| 6,200,411 B1 | 3/2001 | Eikhoff et al. | 156/329 |
| 6,228,929 B1 * | 5/2001 | Larson et al. | 524/495 |
| 6,369,703 B1 * | 4/2002 | Lill | 340/447 |
| 6,437,039 B1 | 8/2002 | Ahmed et al. | 524/492 |

FOREIGN PATENT DOCUMENTS

| | | |
|---|---|---|
| EP | 1213323 | 6/2002 |

OTHER PUBLICATIONS

Material Safety Data Sheet, Henkel Loctite Corporation, 1001 Trout Brook Crossing, Rocky Hill, Connecticut 06067-3910. As downloaded from the web site www.loctite.com on Dec. 29, 2002.

* cited by examiner

PNEUMATIC RUBBER TIRE HAVING ANNULAR RUBBER STRIP CONTAINING ELECTRICALLY CONDUCTIVE BONDED TO ITS INNER SURFACE

FIELD OF THE INVENTION

A pre-cured pneumatic rubber tire of open toroidal shape having a pre-cured rubber strip, comprised of at least one elastomer and which contains at least one electrically conductive element, adhesively bonded to an inner surface of the tire's cavity. The adhesive is an RTV polysiloxane comprised of an hydroxyl terminated (silanol terminated) polysiloxane and crosslinking agent. The adhesive is applied as a layer, or coating, thereof onto a surface of said pre-cured rubber strip, and/or onto a corresponding pre-cured inner surface of said pre-cured tire, and the resulting coated pre-cured rubber strip and inner surface of said pre-cured tire brought together with said layer of adhesive therebetween and the adhesive allowed to cure and thereby bond said strip to said tire inner surface. In one aspect of the invention, said strip is an annular pre-cured rubber strip bonded to the tire's inner surface in its crown region or to said tire inner surface circumferential with and close to the periphery of the tire's open cavity. In another aspect of the invention, said tire inner surface is of a textured configuration and optionally contains a thin coating thereon of a polysiloxane material. In a further aspect of the invention, said pre-cured rubber strip contains a microprocessor inductively and/or electrically connected to said electrically conductive element(s), for example a wire antenna, contained in said rubber strip.

BACKGROUND OF THE INVENTION

Pneumatic tires are conventionally of an open toroidal shape which defines a cavity which is substantially enclosed by the tire and the closure of the cavity is conventionally completed by mounting the tire on an intended rigid rim. The tire conventionally has a rubber innerliner which is co-existent with and is an exposed surface of the tire cavity. Such pneumatic tire configurations are conventional as would be understood by one having skill in such art.

Pneumatic tires usually rely upon air pressure to maintain their shape and associated performance during service conditions, although some pneumatic tires may be designed to hold their shape and provide representative performance, at least for limited times, even though they may have lost or are not able to maintain their internal air pressure for various reasons. For the purpose of the description of this invention, such tires are considered herein to be pneumatic tires even though they might be designed to run without an internal air pressure for limited periods of time.

For various applications, it may be desirable to provide a pneumatic rubber tire with a sensing device (e.g. transducer and associated microprocessor) on its inner surface which has a capability of electronically receiving power generated from an electromagnetic wave generating source outside the tire and transmitting various data relating to the tire such as, for example, its internal air pressure and temperature relative to an external transmitting and receiving device.

It may be desirable to provide such a tire with a suitable antenna as an actual part of the tire for both receiving various electromagnetic signals from an exterior source by an internal sensing device within the tire such as a transducer and for transmitting various electromagnetic signals from within the tire to an external receiving device. For the purposes of the description of this invention, such components which may include one or more of a transducer, associated dedicated integrated circuit microprocessor and other associated component(s), and particularly a transponder, which are more simply collectively referred to herein as a microprocessor.

In practice, such antenna may be provided as at least one electrically conductive element (e.g. a metallic wire) extending substantially throughout the length of the rubber strip, particularly where the pre-cured rubber strip is in a form of an annular rubber strip. The antenna may be connected, for example, to the microprocessor either physically or inductively.

Such an annular rubber strip will contain at least one electrically conductive element basically extending substantially or entirely throughout its length (e.g. one or more electrically conductive metal wires) for its purpose and have suitable elastomeric properties for compatibility with the inner rubber surface of the tire.

For this invention, it is envisioned that such annular rubber strip, generally in a form of a ring, is provided as being bonded to an inner surface of the toroidal tire cavity via an RTV (room temperature vulcanizable in the presence of moisture such as example atmospheric humidity) hydroxyl terminated (namely silanol terminated) organosiloxane composition.

Representative of such RTV compositions for use in this invention are those which are comprised of a silanol terminated organopolysiloxane and a silane based crosslinking agent which contains a silane group such as —Si—$R_x$, where x is a value of from one to and including three, capable of crosslinking a silanol terminated organopolysiloxane. Representative of such silane based crosslinking agents are those having at least one silane group capable of crosslinking a silanol terminated RTV organopolysiloxane where R may be selected from at least one of oxime, acetoxy, methoxy, ethoxy, amine, oximino and enoxy moieties and their mixtures. Thus, it is contemplated that such silane group may be, for example, an oximesilane, acetoxysilane, methoxysilane, aminesilane, oximinosilane and/or enoxysilane, so long as it has a capability of crosslinking the RTV organopolysiloxane. Such silane based crosslinking agents for crosslinking silanol terminated RTV organopolysiloxane are well known to those having skill in such art. For one aspect of the practice of this invention an oximinosilane is preferred. Examples of various oximinosilane and oxime related RTV crosslinking agents are, for example, illustrated in U.S. Pat. Nos. 6,200,411, 4,918,209, 4,400, 527, 4,380,660 4,735,979, 3,189,576, 4,323,489 and 4,720, 530. An example of use of an acetoxy based crosslinking agent may be found, for example, in U.S. Pat. Nos. 3,382, 205 and 3,035,016. Hydroxyl terminated (namely silanol terminated) organopolysiloxanes for use in RTV compositions for the purposes of this invention may be hydroxyl terminated organopolysiloxane, dihydroxyl terminated organopolysiloxane, hydroxyl terminated in diorganopolysiloxane and dihydroxyl terminated diorganopolysiloxane. The hydroxyl groups are envisioned as being silanol groups. Representative examples of hydroxyl terminated organopolysiloxanes for use in an RTV composition are illustrated, for example, in one or more of the above U.S. patents as well as U.S. Pat. Nos. 6,013,754 and 6,437,039.

For the description of this invention, the term "phr" refers to "parts by weight of a designated ingredient in a rubber composition per 100 parts by weight of rubber".

The terms "rubber" and "elastomer" are considered herein to be interchangeable unless otherwise indicated.

The terms "rubber compound" and "rubber composition", or "elastomer composition", where used, are considered herein to be interchangeable unless otherwise indicated. The terms "vulcanized" and "cured" are used interchangeably under otherwise indicated.

In the description of this invention, various RTV polysiloxane compositions are described which are comprised of a silanol terminated polysiloxane and crosslinking agent which may be in a form of a one part RTV adhesive which contains both the silanol terminated polysiloxane and the crosslinking agent or may be a two part adhesive in which the user mixes a first part comprised of the silanol terminated polysiloxane with a second part comprised of the crosslinking agent prior to application. Such use of one part and two part RTV adhesives is well known to those having skill in such art.

SUMMARY AND PRACTICE OF THE INVENTION

A pneumatic rubber tire of an open toroidal shape with an inner rubber surface substantially co-existent with its open toroidal cavity, wherein a portion of said tire inner rubber surface contains a rubber strip (e.g. annular rubber strip) adhesively bonded thereto by an adhesive layer positioned between said rubber strip and said tire inner rubber surface, wherein said rubber strip contains at least one electrically conductive element substantially coextensive with the length of said rubber strip, wherein said adhesive layer is comprised of an RTV composition comprised of hydroxyl terminated (silanol terminated) polysiloxanes crosslinked with a crosslinking agent which contains a silane group capable of crosslinking a silanol terminated organopolysiloxane wherein said silane group contains a substituent selected from at least one of oxime, acetoxy, methoxy, ethoxy, amine, oximino and enoxy groups and their mixtures.

For example, it is envisioned herein that such crosslinking agent may be comprised of, for example, at least one of oximesilane, acetoxysilane, methoxysilane, ethoxysilane, aminesilane, enoxysilane and oximinosilane, preferably an oximinosilane group.

Such crosslinking agent may be comprised of, for example, a vinyltris(methyl ethyl ketoximo) silane or comprised of methyltris(methyl ethyl ketoximo) silane of the general Formula (I) the preparation of which is described in aforesaid U.S. Pat. No. 4,918,209:

(I)

In further accordance with this invention, a pneumatic tire is prepared by a method which comprises;

(A) providing a sulfur cured pneumatic rubber tire of an open toroidal shape with an inner cured rubber surface substantially co-existent with its open toroidal cavity;

(B) providing a cured rubber strip (e.g. annular cured rubber strip) of a rubber composition comprised of at least one elastomer and which contains at least one electrically conductive element substantially co-existent with the length of said annular strip;

(C) applying a coating of an adhesive layer of an RTV polysiloxane composition to a surface of said cured rubber strip and/or to a portion of said inner cured rubber surface of said tire, wherein said adhesive layer is comprised of an hydroxyl terminated (silanol terminated) organopolysiloxane and crosslinking agent capable of crosslinking silanol terminated organopolysiloxanes wherein said crosslinking agent contains a substituted silane group with a substituent selected from at least one of oxime, acetoxy, methoxy, ethoxy, amine, oximino and enoxy groups and their mixtures;

(D) applying said coated cured rubber strip to said cured inner rubber surface of said tire cavity with said adhesive layer therebetween; and (E) curing said adhesive layer to thereby bond said cured rubber strip to said cured inner rubber surface of said tire.

In one aspect, it is envisioned that such crosslinking agent is an oximiosilane comprised of a methyltris(methyl ethyl ketoximo) silane of aforesaid general Formula (I).

In practice, the pre-cured rubber strip may be an annular rubber strip or may be in the nature of a patch in a form of one or more individual (non-annular) strips of various geometric shapes such as, for example, of a circular, square, rectangular, crescent, oval or rhombic shape.

In practice, such patch may have embedded therein a microprocessor and an electrically conductive wire antenna connected thereto.

In practice, the pre-cured rubber strip contains said electrically conductive element as an antenna and a microprocessor, wherein said microprocessor is inductively or directly connected to said antenna. Where said pre-cured rubber strip is an annular pre-cured rubber strip, it is envisioned that said electrically conductive element (e.g. an antenna wire) is substantially co-extensive with the length of the strip.

In additional accordance with this invention, a pneumatic tire prepared by such method is provided.

In further accordance with this invention, such a pneumatic tire is provided where said rubber strip is an annular rubber strip positioned on said inner rubber surface of said tire in its crown region, sidewall region and particularly in a lower portion of the tire sidewall as being circumferential with and spaced radially inward (toward the tire's crown region) from and in close proximity to the peripheral edge of the said open toroid tire cavity. The annular rubber strip, which contains an antenna as an electrically conductive element is desirably spaced apart from the peripheral edge of the tire's open cavity to avoid potential electrical interference from the tire's metal bead core as well as a rigid metal rim onto which it may be intended to mount the tire to close the tire's open cavity and to form a wheel assembly of the tire and rim for suitably mounting onto a an appropriate vehicle. In practice, the annular rubber strip may be positioned, for example, a relatively minimal distance (e.g. 1.5 to 6 cm) from the peripheral inner surface edge of the tire's open cavity depending somewhat upon the size and dimensions of the tire itself.

In additional accordance with this invention, the pneumatic tire is provided wherein said inner cured rubber surface of said tire has a somewhat three dimensional textured configuration or pattern. The textured inner surface of the tire cavity is imparted by a textured surface of a rubber tire curing bladder as it is pressed against the inner surface tire cavity during the molding and curing of the uncured rubber tire in a suitable mold. In practice, the uncured tire is positioned in a suitable mold and a heated expandable rubber bladder is typically positioned within the tire cavity to press the tire against the mold to shape and cure the tire within the mold. In practice, such tire cure bladder often has a textured surface. Such cure bladder textured surface imparts a reverse image, or textured surface, on the resultant cured inner surface of the pneumatic tire cavity. Such tire curing operation, use of a tire cure bladder with a textured surface and formation of a textured inner surface of a pneumatic tire cavity is well known to those having skill in such art.

It is contemplated herein that such textured configuration of the cured tire's inner surface of its open cavity aids in providing a physical/chemical bonding of the pre-cured rubber strip (e.g. a closed annular rubber ring) to the pre-cured tire inner surface via the RTV polysiloxane adhesive, particularly as the uncured RTV adhesive flows into the interstices of the textured surface.

In addition, for such tire curing operation and prior to application of said pre-cured rubber strip, a very thin polysiloxane release coating is often applied to the tire cure bladder surface, and sometimes also to the surface of the uncured tire itself, in order to aid in providing release and slippage between the bladder and inner tire surface during the tire curing operation. Such application is well known to those having skill in such art. It is envisioned that such polysiloxane on the tire inner surface may be, for example, primarily a methyl terminated organopolysiloxane which may also comprise an hydroxyl terminated organopolysiloxane. As a result, the inner surface of the pneumatic tire cavity contains a residual polysiloxane coating. If the tire cavity inner surface has a textured surface, it is envisioned that the very thin polysiloxane coating thereon also has a textured surface to present the associated RTV polysiloxane adhesive.

Accordingly, in further accordance with this invention, wherein said cured inner rubber surface of said tire contains a polysiloxane based coating thereon it is envisioned that the RTV adhesive composition is bondable to said polysiloxane coated inner rubber surface of the tire's open cavity via the said crosslinking of the RTV adhesive.

In practice, the said cured inner rubber surface of said tire and for the cured annular rubber strip may be comprised of (A) diene hydrocarbon-based rubbers as homopolymers and copolymers of conjugated diene hydrocarbons such as, for example, isoprene and 1,3-butadiene and copolymers of at least one conjugated diene hydrocarbon selected from isoprene and 1,3-butadiene with a vinyl aromatic compound selected from styrene and alpha-methylstyrene, preferably styrene, as well as tin coupled organic solvent solution polymerization prepared polymers of at least one of isoprene and 1,3-butadiene and copolymers of isoprene and/or 1,3-butadiene with styrene, or (B) an isobutylene-based rubber as a butyl rubber or halogenated butyl rubber as a copolymer, or halogenated copolymer with bromine or chlorine, of isobutylene and a minor amount (e.g. from about 2 to about 8 phr) of a conjugated diene hydrocarbon such as, for example, isoprene.

Representative of such diene-based elastomers are, for example, cis 1,4-polybutadiene, trans 1,4-polybutadiene, syndiotactic polybutadiene, polyisoprene whether natural or synthetic, styrene/butadiene copolymer rubber whether solution or aqueous emulsion polymerization prepared, isoprene/butadiene copolymer rubber, styrene/isoprene copolymer rubber and styrene/isoprene/butadiene terpolymer rubber.

A further example of elastomers are tin coupled, solution polymerization prepared elastomers as cis 1,4-polyisoprene, cis 1,4-polybutadiene and isoprene/butadiene copolymers.

In practice, said cured rubber strip in a form of an annular rubber strip may have an overall thickness in a range of about 0.1 to about 1, alternately in a range of about 0.5 to about 1.5, centimeters, depending somewhat upon the tire size and may have a width in a range of about 1 to about 2 centimeters, also depending somewhat upon the tire size with which it is used.

In one aspect of this invention, said rubber strip contains an antenna as an electrically conductive element (e.g. an electrically conductive metal wire) which is designed to receive electromagnetic waves, (e.g. relatively low to medium frequency waves) within the tire from an electromagnetic transmitting means, or source, outside the tire and to transmit electromagnetic waves from within the tire to a receiving means for an electromagnetic wave.

In one aspect of the invention, the rubber strip (e.g. annular rubber strip) which contains at least one electrically element as an antenna, is positioned on the inner rubber surface of the tire cavity (e.g. a tire innerliner) which is physically or inductively connected to a microprocessor. The electrically conductive elements may therefore be a metallic wire on a form of, or example, a cable of a plurality of wires extending one revolution or several revolutions within the length of the annular rubber strip.

Alternatively, for connecting to the microprocessor, the electrical element (e.g. wire) of the antenna may have discontinuous sector in which two ends are independently connected to the microprocessor or the electrical element (e.g. wire or wires) may be continuous in nature and may pass through a housing for the microprocessor in a manner that the microprocessor is inductively connected to the antenna.

Also accordingly, then, a means may be provided for receiving electromagnetic signals from an electromagnetic signal generating means outside of a tire and for transmitting electromagnetic signals from within the tire to an electromagnetic signal receiving means outside of the tire which comprises providing a tire with an antenna within the tire; wherein said antenna is may be, for example, an electrically conductive metal wire embedded within the annular rubber strip bonded on an inner surface of a cavity of a pneumatic tire.

Therefore, in one aspect of the practice of the invention, the annular cured rubber strip is in a form of a ring positioned in the crown region of the tire or circumferentially around and spaced apart from the peripheral edge of said internal cavity of said tire, where said annular rubber strip contains an electrically conductive wire as an antenna within said annular rubber strip which is substantially coextensive with the length of said annular rubber strip, wherein said annular rubber strip contains a microprocessor in a housing for said microprocessor, wherein said annular rubber strip passes through said housing and wherein said microprocessor is inductively connected within said housing to said antenna.

For a further understanding of the invention, reference is made to the accompanying drawings.

In the drawings.

Figures 1, 1A:
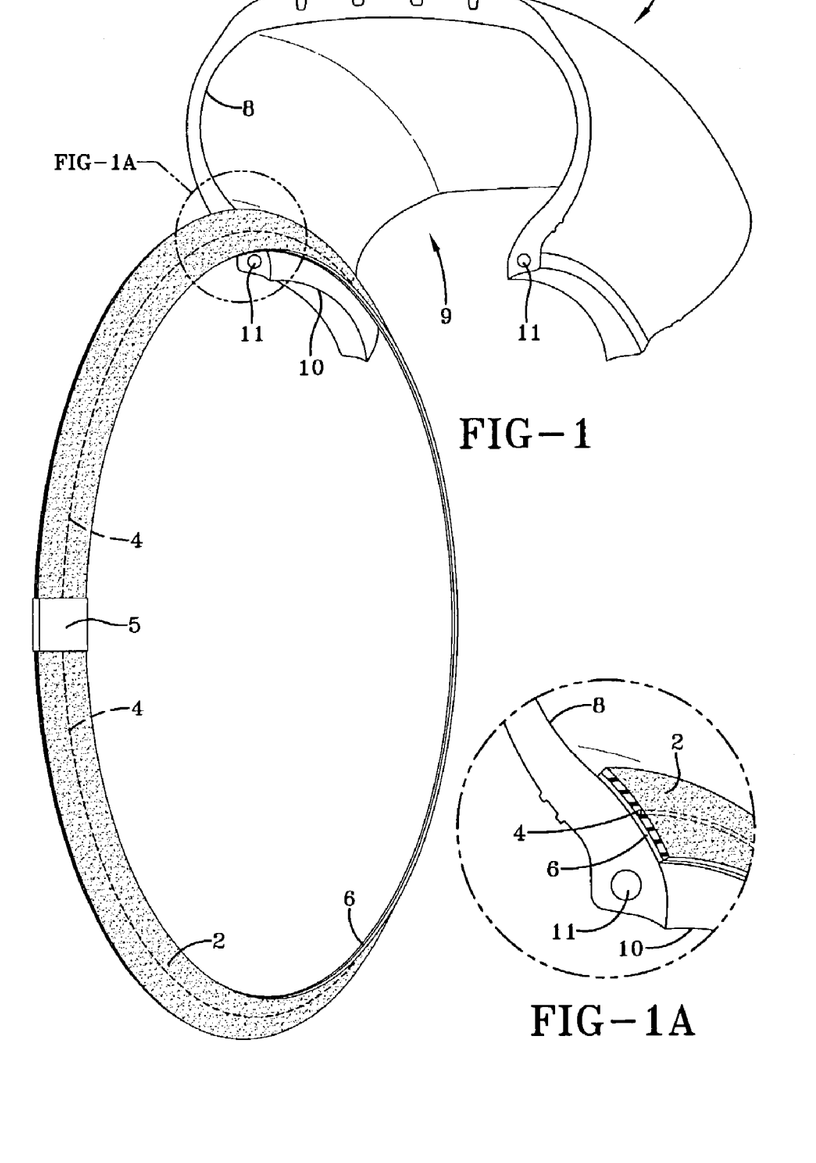
FIG. 1 is a perspective view of a portion of a cross-section of a open toroidally shaped pre-cured rubber tire (1) in which a pre-cured annular rubber strip in a shape of a ring (2) is positioned on the inner surface (8) of and circumferentially with and about 3 to 4 centimeters radially inward, toward the crown region of the tire (crown region shown but not numbered), from the peripheral edge (10) of the tire's inner cavity (9) near the metal bead (11) region of the tire and bonded to the inner rubber surface of the pneumatic tire cavity (3) via the RTV polysiloxane adhesive layer (6) therebetween having been applied to a surface of said pre-cured tire inner surface (8) and/or said pre-cured annular rubber strip (2). The annular rubber strip contains a continuous electrically conductive metallic wire (4) extending throughout the length of the annular rubber strip (2) as an antenna. The annular rubber strip (2) which contains the metallic wire antenna (4) which passes through a housing (5) with contains a microprocessor (not shown) within which the antenna is inductively connected to the microprocessor.
FIG. 1A is an expanded view of the indicated portion of the of FIG. 1 intended to more clearly show a layer (6) of RTV adhesive which bonds the annular rubber strip (2) to the inner surface of the tire cavity (9).
Figures 2, 2A:
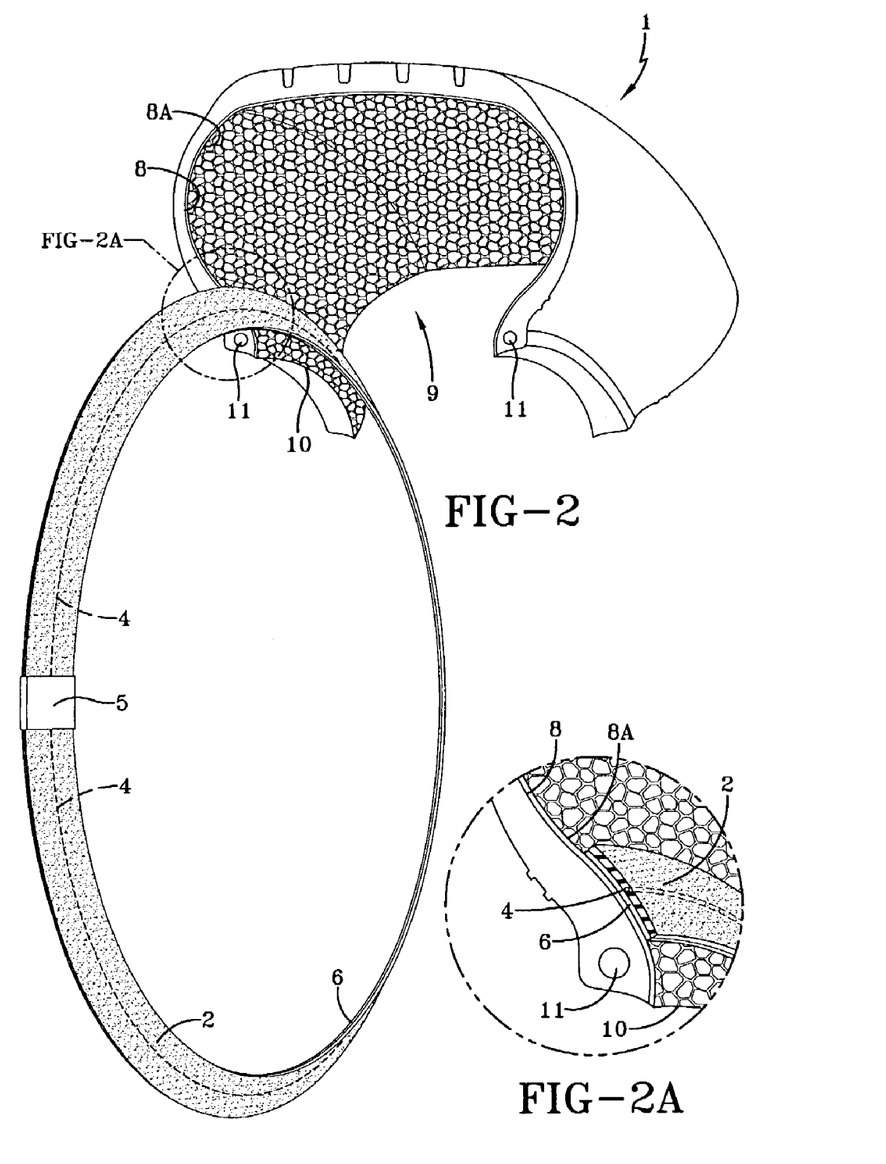
FIGS. 2 and 2A are similar to FIGS. 1 and 1A except that a thin layer of a polysiloxane (8A) is contained on the inner rubber surface (8) of the tire cavity (9) as a result of curing the tire with a polysiloxane coated cure bladder. The inner rubber surface (8), and polysiloxane coating (8A) are depicted in FIGS. 2 and 2A with a textured surface of a three dimensional configuration having been imparted by the surface of a tire curing bladder during the curing of the tire. It is considered herein that the layer (6) of RTV adhesive, prior to its curing, flows into the interstices of the textured surface to aid in creating a physical/chemical bond upon curing the RTV adhesive layer (6).
Figure 3:
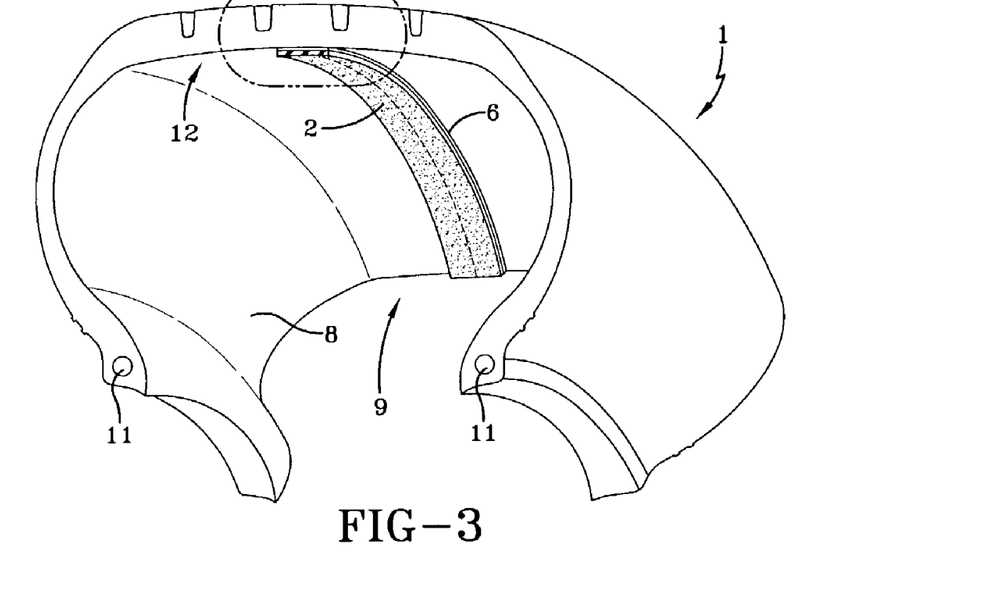
FIG. 3 depicts the pre-cured annular rubber strip (2) positioned on the inner surface (8) of and circumferentially on the crown region (12) of the tire with the adhesive layer (6) therebetween.
Figure 3A:
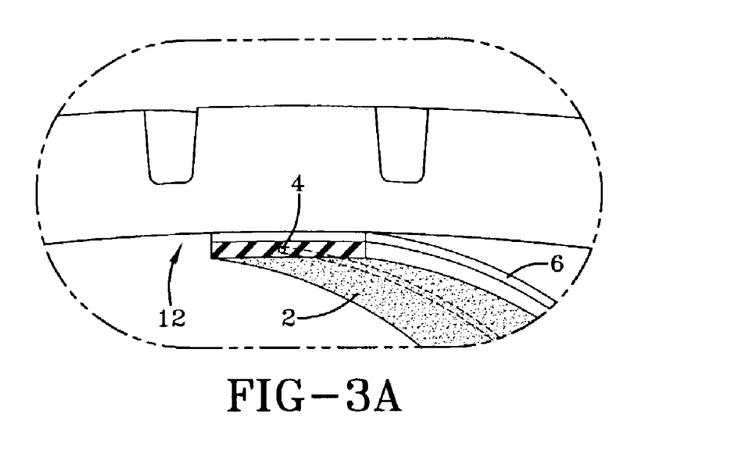
FIG. 3A is an expanded view of the indicated portion of FIG. 3 intended to more clearly show the indicated portion.
Figure 4:
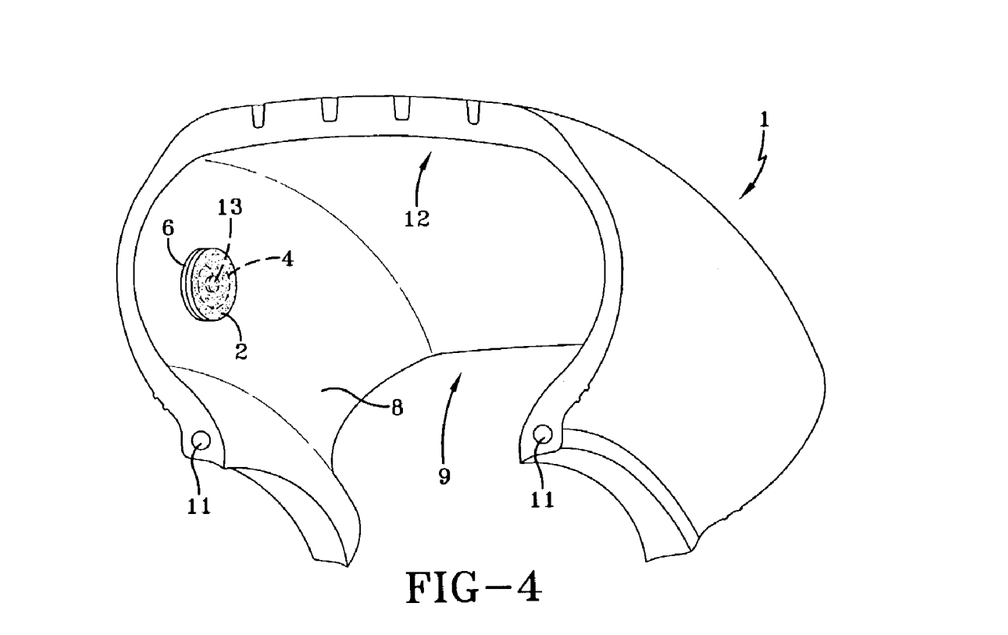
FIG. 4 depicts a pre-cured rubber strip (13) positioned on the inner surface (8) of the tire (1) with the adhesive layer (6) therebetween. In particular, the pre-cured rubber strip (2) contains a microprocessor (13) embedded therein with an electrically conductive wire (4) as an antenna connected to and extending from the microprocessor (13).
Figure 4A:
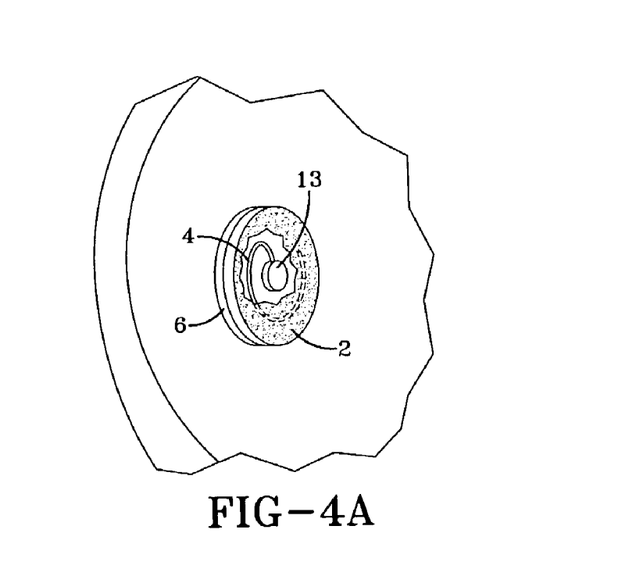
FIG. 4A is an expanded view of the indicated portion of FIG. 4 intended to more clearly show the indicated portion.

As hereinbefore related, in practice, RTV polysiloxanes are contemplated which are comprised of at least one silanol terminated organopolysiloxane and a crosslinking agent having a silane based moiety capable of crosslinking the silanol terminated organopolysiloxane. As hereinbefore related, such RTV polysiloxanes may be of a one part variety and simply applied to an inner surface of said pre-cured tire and/or to a surface of said pre-cured annular rubber strip, or ring or it may be of two part variety in which the two parts of the RTV adhesive composition are blended together just before application to one or more of the aforesaid pre-cured rubber surfaces. Such RTV polysiloxane adhesive in a form of a one part and of a two part variety are well known to those having skill in such art.

As hereinbefore related, the silanol terminated organopolysiloxane includes, for example, silanol terminated organopolysiloxanes, polysilanol terminated polysiloxanes, silanol terminated diorganopolysiloxanes and polysilanol diorganopolysiloxanes.

As also hereinbefore related, such crosslinking agent preferably comprises, or contains, an oximinosilane group which may be, for example, be comprised of a methyltris (methyl ethyl ketoximo) silane of the aforesaid Formula (I).

Such RTV polysiloxanes typically contain at least one additive for enhancing their thixotropic properties such as, for example, fillers such as calcium carbonate, carbon black, amorphous silica and siloxane treated amorphous silica as well as polysiloxanes which are not hydroxyl terminated which may be methyl terminated.

The RTV adhesive preferably has a flexibility of at least 400 percent elongation prior to breaking. The RTV adhesive, prior to curing, preferably is of a thixotropic paste consistency (at 25° C.) and has sufficient flowability to spread upon application to fill interstices of a textured surface of a tire innerliner.

In one aspect of the invention, a contemplated RTV polysiloxane bonding adhesive having such properties for use in the practice of this invention is Loctite product R5900™ from the Loctite of Rocky Hill, Conn., USA. The R5900™ is understood as being a room temperature vulcanizing silicone bonding material/sealant from a oxime silicone class materials.

For further description of the R5900™ as an oxime class of silicone material, and associated technical information, the Loctite product 5900™ Technical Data Sheet (Worldwide version dated August 2002) is expressly incorporated by reference herein in its entirety.

In particular, the Loctite product R5900™ believed to have a specific gravity at 20° C. of about 1.3 to about 1.37, as a thixotropic black colored paste having a viscosity at 25° C. exhibited by an extrusion rate (gm/min), using a 3 mm diameter nozzle at 6 bar pressure in a range of from about 20 to about 50. In its cured state, it is understood to exhibit a Shore A hardness (ASTM D2240) in a range of about 30 to about 40, namely about 35, an elongation at break (ASTM D412) of at least about 400 percent and a minimum tensile strength (ASTM D412) of 1.4 N/mm$^2$. These and other physical properties are recited from the aforesaid Loctite product R5900™ Technical Data Sheet and a Material Data Sheet accompanying the R5900™ product.

In particular, the Loctite product R5900™ is reported in its five page Material Safety Data Sheet, dated Dec. 22, 2002 (expressly incorporated by reference herein in its entirety) as being comprised of about 30 to 40 weight percent hydroxyl terminated polysiloxane, about 5 to 15 weight percent of a methyl terminated polysiloxane, an oximinosilane presumably as a crosslinkng agent and fillers as calcium carbonate (40 to 50 weight percent), carbon black (1 to 3 weight percent), stearic acid (0.5 to 2 percent) and amorphous treated silica (1 to 5 weight percent). According to the Material Safety Data Sheet, when the product is exposed to moisture, methyl ethyl ketoxime is formed. It is presumed that it is a byproduct of the oximinosilane as a crosslinking agent.

It is readily understood by those having skill in the art that the rubber compositions for tire and annular strip may be compounded by mixing the various sulfur-vulcanizable constituent rubbers with various commonly-used additive materials such as, for example, curing aids, such as sulfur, activators, retarders and accelerators, processing additives, such as resins including tackifying resins, and plasticizers, fillers, pigments, fatty acid, zinc oxide, waxes, antioxidants and antiozonants, peptizing agents and reinforcing materials such as, for example, the aforesaid carbon black. As known to those skilled in the art, depending on the intended use of the sulfur vulcanizable and sulfur vulcanized material (rubbers), the additives mentioned above are selected and commonly used in conventional amounts.

Peroxide cure could also be used in a fashion known to those skilled in the art, particularly where butyl rubber or halobutyl rubber is used (e.g. chlorobutyl or bromobutyl rubber).

Tackifier resins, if used, comprise about 0.5 to about 10 phr, usually about 1 to about 5 phr. Rubber processing oil is definitely not desired. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can preferably be primarily stearic acid, may comprise about 0.5 to about 5 phr. It is to be appreciated that stearic acid commonly used for rubber compounding purposes is typically composed of about 30 to about 80 weight percent stearic acid and the remainder being typically primarily composed of other saturated, fatty acids like saturated C12, C14, C16 and C20 chains. Such material, in such a relatively impure state, is commonly referred to in the rubber compounding practice as "stearic acid" and is so referred to in the description and practice of this invention. Typical amounts of zinc oxide can be, for example, about 2 to about 5, and sometimes even up to about 15, phr. Typical amounts of waxes comprise about 1 to about 5 phr. Often microcrystalline waxes are used. Typical amounts of peptizers, if used, comprise about 0.1 to about 1 phr. Typical peptizers, if used, may be, for example, pentachlorothiophenol and dibenzamidodiphenyl disulfide.

The vulcanization is typically conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.0 to about 3.5, sometimes from 2 to about 3 being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.0, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur-vulcanizing agent and accelerator(s) are not considered to be an aspect of this invention. The presence and relative amounts of the above additives are not considered to be an aspect of the present invention which is more primarily directed to the preparation and use of an electrically-conductive rubber composition as a component of an article of manufacture and, particularly as an antenna within a pneumatic tire.

The mixing of the rubber compositions can be accomplished by methods known to those having skill in the rubber mixing art. For example, the ingredients are desirably mixed, as hereinbefore described, in at least two stages, namely, at least one non-productive stage without sulfur curative followed by a productive mix stage in which a sulfur curative is added. The final curatives are typically mixed in the final stage which is conventionally called the "productive" mix stage in which the mixing typically occurs at a temperature, or ultimate temperature, lower than the mix temperature(s) of the preceding non-productive mix stage(s). The rubber, carbon black and other ingredients are mixed in one or more non-productive mix stages. The terms "non-productive" and "productive" mix stages are well known to those having skill in the rubber mixing art.

The invention may be better understood by reference to the following examples in which the parts and percentages are by weight unless otherwise indicated, and the various rubbers, or elastomers, are solid rubbers unless otherwise specified.

EXAMPLE I

A cured pneumatic rubber tire of size P225/60R16 of an open toroidal shape is prepared. The inner surface of the tire, coexistent with its open toroidal cavity is of a rubber composition comprised of, insofar as the elastomer is concerned, bromobutyl rubber, namely a brominated butyl rubber (e.g. brominated copolymer of isobutylene and a minor amount of isoprene).

EXAMPLE II

A cured rubber strip, which for this Example is an annular shaped cured rubber strip, or ring, is prepared which contains at least one electrically conductive element, namely a cabled strand of metal wires, embedded within the rubber strip which extends along the length of the strip. Said strip is of a rubber composition comprised of, insofar as elastomers are concerned, natural rubber and emulsion polymerization prepared styrene/butadiene copolymer rubber (SBR). The annular cured rubber strip in a form of a ring has an outside diameter of about 47 cm, an overall thickness of about 0.9 cm and an overall width of about 1.3 cm.

EXAMPLE III

The annular shaped cured rubber strip of Example II is bonded to an inner surface of the cavity of the cured rubber tire of Example I.

In particular, a coating (thin layer) of a one part RTV hydroxyl terminated polysiloxane which contains an oximinosilane crosslinking agent as R5900™ from the Loctite is applied to the surface of the annular cured rubber strip (ring) intended to be bonded to the inner cured rubber surface of the pneumatic tire.

The coated pre-cured annular rubber strip is then pressed against the inner surface of the pre-cured pneumatic tire with the layer of said RTV polysiloxane material therebetween. The cured rubber inner surface has a three dimensional textured configuration with a very thin organopolysiloxane coating thereon having been imparted by a tire cure bladder. The layer of RTV polysiloxane material is allowed to flow into the interstices of the textured inner surface of the tire cavity and to cure, and thereby effectively bond said annular strip to said tire inner surface at a temperature of about 25° C. for about 24 hours.

The annular rubber strip was located in the inner surface of the tire circumferential with and about 2 to 4 centimeters radially inward (toward the crown region of the tire) from the peripheral edge of the tire's open toroidal cavity.

While certain representative embodiments and details have been shown for the purpose of illustrating the invention, it will be apparent to those skilled in this art that various changes and modifications may be made therein without departing from the spirit or scope of the invention.

What is claimed is:

1. A cured pneumatic tire having an open toroidal shape with an open toroidal cavity and with an inner cured rubber surface substantially co-existent with said open toroidal cavity;
   wherein a portion of said tire inner cured rubber surface contains a cured annular rubber strip adhesively bonded thereto by an adhesive layer positioned between said cured annular rubber strip and said tire inner rubber surface;
   wherein said annular cured rubber strip is in a form of an annular ring positioned in close proximity to, circumferentially around, and spaced apart from the peripheral edge of said internal cavity of said tire;
   wherein said annular cured rubber strip contains:
   (A) an electrically conductive wire as an antenna within said annular cured rubber strip which is substantially coextensive with the length of said annular cured rubber strip, and
   (B) a microprocessor in a housing for said microprocessor, wherein said annular cured rubber strip passes through said housing and wherein said microprocessor is inductively connected within said housing to said antenna;
   wherein said adhesive layer is comprised of a cured RTV composition comprised of an hydroxyl terminated polysiloxane crosslinked with a methyltris(methyl ethyl ketoximo) silane crosslinking agent, calcium carbonate, carbon black, amorphous silica, and stearic acid;
   wherein said tire inner cured rubber surface to which said adhesive layer is positioned has a three dimensional textured configuration;
   wherein, for said adhesive layer, said hydroxyl terminated organopolysiloxane is comprised of at least one of silanol terminated organopolysiloxane, disilanol terminated organopolysiloxane and disilanol terminated diorganopolysiloxane; and
   wherein said rubber for said tire inner cured rubber surface and said annular cured rubber strip is comprised of at least one of:
   (1) homopolymers and copolymers of at least one of isoprene and 1,3-butadiene and copolymers of at least one of isoprene and 1,3-butadiene with styrene, or
   (2) isobutylene-based rubbers as copolymers of isobutylene and from about 2 to about 8 weight percent units derived from isoprene and such isobutylene-based copolymers halogenated with chlorine or bromine;
   wherein said inner cured rubber surface of said tire contains a polysiloxane based coating thereon and said adhesive composition is bonded to said polysiloxane coated inner cured rubber surface by the crosslinking of said adhesive therewith.

* * * * *

UNITED STATES PATENT AND TRADEMARK OFFICE
CERTIFICATE OF CORRECTION

PATENT NO.        : 7,318,464 B2
APPLICATION NO.   : 10/346652
DATED             : January 15, 2008
INVENTOR(S)       : Bruce Raymond Hahn et al.

Page 1 of 1

It is certified that error appears in the above-identified patent and that said Letters Patent is hereby corrected as shown below:

On the Title Page, item 54 and Col. 1, Line 3 please add the word --ELEMENT-- between the words "CONDUCTIVE" and "BONDED".

Signed and Sealed this

Third Day of June, 2008

JON W. DUDAS
*Director of the United States Patent and Trademark Office*